G. McGREGOR.
NUT-LOCKS FOR RAILROAD-JOINTS.
No. 181,961.  Patented Sept. 5, 1876.
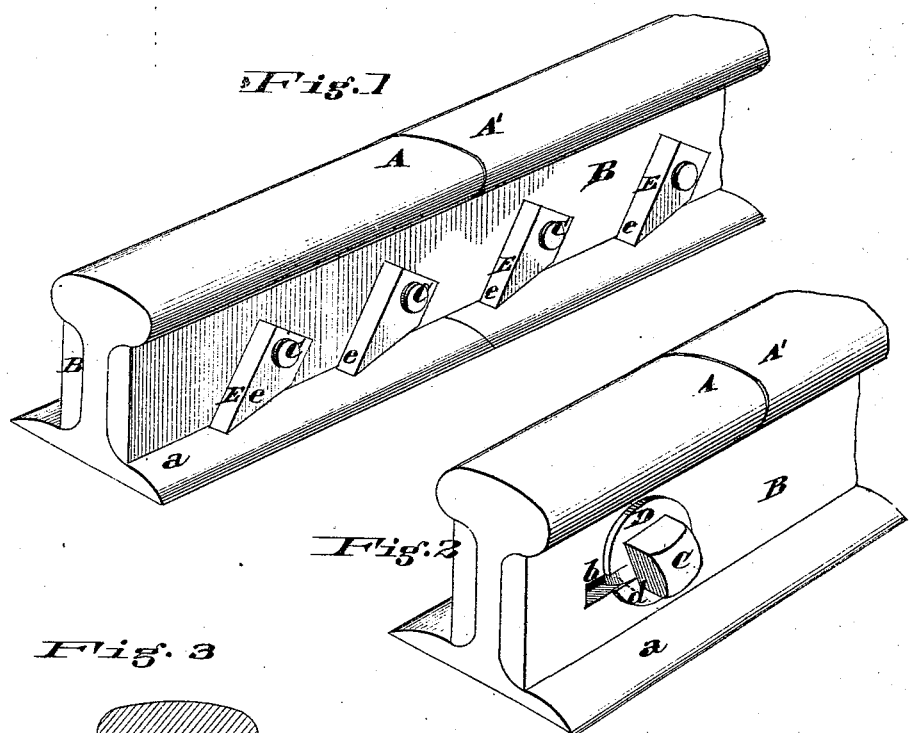
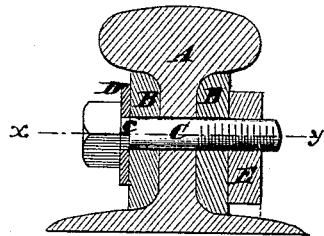
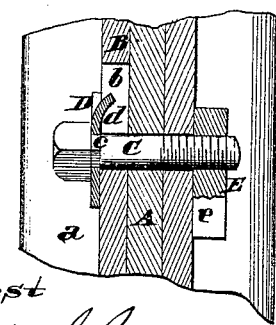
Inventor
Geo McGregor
By F. Millward
Atty
Attest
Edgar J. Gross
John E. Jones

UNITED STATES PATENT OFFICE.

GEORGE McGREGOR, OF CINCINNATI, OHIO, ASSIGNOR TO THE HORSE CLOG COMPANY, OF SAME PLACE.

IMPROVEMENT IN NUT-LOCKS FOR RAILROAD-JOINTS.

Specification forming part of Letters Patent No. 181,961, dated September 5, 1876; application filed July 25, 1876.

*To all whom it may concern:*

Be it known that I, GEORGE MCGREGOR, of Cincinnati, Hamilton county, State of Ohio, have invented an Improvement in Nut-Locks for Railroad-Joints, of which the following is a specification:

My invention has for its object the construction of a nut-lock for fish-plate rail connection that shall be of comparatively inexpensive construction, and that shall most effectually resist the loosening power of shocks from a passing train, while admitting of easy detachment, when necessary, without material injury thereto; and my invention consists, in connection with peculiarly-slotted fish-plate and retaining-bolt, of a certain construction of lipped washer, rigidly identical in action with the bolt, to engage with the slotted fish-plate, and a certain elongated retaining-nut, to engage with the bolt, and against the base-flange of the rail, all more fully described hereafter.

Figure 1 is a perspective view of a railroad-rail joint embodying my improvement. Fig. 2 is also a view of the rail-joint, taken from opposite side of rail to that shown in Fig. 1. Fig. 3 is a vertical section through rail-fastening at the axial line of retaining-bolt. Fig. 4 is a horizontal section of rail-fastening, taken on line $x\,y$, Fig. 3.

A A' are the ends of two T-rails, secured together by bolts through suitable perforations in the fish-plates B. These bolts, C, are provided with polygonical-shaped necks $c$, to engage fixedly with the washers D. The fish-plate B is provided with a slot, $b$, in close proximity to the position of bolt-hole, and when the bolt C, provided with washer D, is in position through the fish-plates and T-rail, the said washer will extend over this slot $b$. E are retaining-nuts, fitted to screw upon the bolts C, and against the fish-plate, so as to secure the fish-plates to the T-rail. These nuts are provided, to prevent their disengaging from the bolts, with elongations $e$, of equal or less thickness than the nut, which elongations are of such extent as to prevent their revolution upon the bolts, when in position, by striking against the base-flange $a$ of the rail A. By this means, so long as the bolt C remains immovable, the nut E cannot possibly disengage. Now, to prevent the bolt C from disengaging with the nut E after having been revolved into it to such an extent that the fish-plates are secured rigidly to rail A, between washer D and nut E, I, by the application of a suitable punch or similar means, force a portion or lip, $d$, of washer D into the slot $b$ of the fish-plate, and thereby, as the bolt C and said washer have an immovable connection, attain the act of perfectly securing the bolt and nut from disengaging under accidental shock from trains passing over the rail. When, however, desired to release the fish-plates from the rail to substitute new rails, or for other purposes, I, by forcing the lip $d$ out of the groove $b$, release the bolt C, and permit the disengagement of the nut and bolt. The washer D, as shown in the drawing, is preferably independent of the bolt C, on account of cheapness of manufacture; but the said washer may, evidently, be formed solid upon the bolt-head. It is also obvious that the function of the elongated nut E may be usurped by a bolt-head of similar construction, and in that case the nut E will be provided with flange or washer similar to bolt-head washer D, to engage in like manner with slotted fish-plate B. In again applying the nut-locking devices after having been once removed, and during which removal, should the lip $d$ have been broken off, it is merely necessary to punch a fresh lip into the slot $b$ from a different part of the washer.

Having thus described my invention, I claim—

In a nut-locking device for rail fish-plates, the combination of bolt C, washer D, provided with lip $d$, fish-plate B, provided with recess $b$, and nut E, provided with elongation $e$, the bolt having an angular or flat-sided portion, and the washer a like-shaped orifice, all substantially as specified.

In testimony of which invention I hereunto set my hand.

GEORGE McGREGOR.

Witnesses:
JOHN E. JONES,
J. L. WARTMANN.